United States Patent
Belleschi et al.

(10) Patent No.: US 10,492,176 B2
(45) Date of Patent: Nov. 26, 2019

(54) METHODS, NETWORK NODE, WIRELESS DEVICE, COMPUTER PROGRAMS AND COMPUTER PROGRAM PRODUCTS FOR USE WITH DISCONTINUOUS RECEPTION

(71) Applicant: Telefonaktiebolaget LM Ericsson (publ), Stockholm (SE)

(72) Inventors: Marco Belleschi, Solna (SE); Gunnar Bergquist, Kista (SE); Christer Gustafsson, Huddinge (SE); Anders Ohlsson, Järfälla (SE); Hongwei Wang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 299 days.

(21) Appl. No.: 14/909,738

(22) PCT Filed: Aug. 2, 2013

(86) PCT No.: PCT/SE2013/050946
§ 371 (c)(1),
(2) Date: Feb. 2, 2016

(87) PCT Pub. No.: WO2015/016755
PCT Pub. Date: Feb. 5, 2015

(65) Prior Publication Data
US 2016/0174207 A1 Jun. 16, 2016

(51) Int. Cl.
*H04W 72/04* (2009.01)
*H04W 52/02* (2009.01)
(Continued)

(52) U.S. Cl.
CPC ....... *H04W 72/0406* (2013.01); *H04L 1/1812* (2013.01); *H04L 1/1822* (2013.01);
(Continued)

(58) Field of Classification Search
None
See application file for complete search history.

(56) References Cited

U.S. PATENT DOCUMENTS

| 2008/0186893 A1* | 8/2008 | Kolding | H04W 52/0235 370/311 |
| 2009/0239566 A1* | 9/2009 | Pelletier | H04W 56/005 455/517 |

(Continued)

FOREIGN PATENT DOCUMENTS

| EP | 2405691 A1 | 1/2012 |
| WO | 2009022310 A2 | 2/2009 |

(Continued)

OTHER PUBLICATIONS

International Search Report, Application No. PCT/SE2013/050946, dated Jun. 11, 2014, 7 pages.

(Continued)

*Primary Examiner* — Olumide Ajibade Akonai
*Assistant Examiner* — Donald H B Braswell
(74) *Attorney, Agent, or Firm* — Sage Patent Group

(57) ABSTRACT

A method performed in a network node of a cellular network that also includes a wireless device, the wireless device being in a discontinuous reception mode having receiving periods and idle periods. The method involves transmitting a first control signal to the wireless device during a receiving period for the wireless device; determining that a first control signal is likely to have failed to be correctly received by the wireless device; and determining that a second control signal needs to be transmitted to the wireless device, the second control signal corresponding to the first control signal. When the wireless device is in an idle period, the method further involves postponing any transmission of the second control signal until the wireless device is in a (Continued)

receiving period; and transmitting the second control signal to the wireless device when the wireless device is in the receiving period.

14 Claims, 5 Drawing Sheets

(51) Int. Cl.
*H04L 1/18* (2006.01)
*H04W 76/28* (2018.01)

(52) U.S. Cl.
CPC ... *H04W 52/0212* (2013.01); *H04W 52/0216* (2013.01); *H04W 76/28* (2018.02); *Y02D 70/1224* (2018.01); *Y02D 70/1242* (2018.01); *Y02D 70/1262* (2018.01); *Y02D 70/1264* (2018.01); *Y02D 70/23* (2018.01); *Y02D 70/24* (2018.01); *Y02D 70/25* (2018.01)

(56) References Cited

U.S. PATENT DOCUMENTS

| | | | |
|---|---|---|---|
| 2013/0223307 A1 | 8/2013 | Ohlsson et al. | |
| 2015/0201375 A1* | 7/2015 | Vannithamby | H04W 24/02 370/311 |

FOREIGN PATENT DOCUMENTS

| | | |
|---|---|---|
| WO | 2009033253 A1 | 3/2009 |
| WO | 2009116912 A1 | 9/2009 |
| WO | WO 2009149400 A1 | 12/2009 |

OTHER PUBLICATIONS

Written Opinion, Application No. PCT/SE2013/050946, dated Jun. 11, 2014, 9 pages.
Sharp, "Benefits of HARQ Retransmission Being Handled Independently of DRX," Oct. 8-12, 2007, 18 pages, 3GPP TSG-RAN WG2 Meeting #59bis, R2-073997, Shanghai, China.
NXP Semiconductors, Philips, "Interactions between downlink HARQ and DRX," Oct. 8-12, 2007, 5 pages, 3GPP TSG-RAN WG2 Meeting #59bis, R2-074209, Shanghai, China.
Samsung, "MIMO and DRX operation on HARQ retransmission," May 20-24, 2013, 4 pages, 3GPP TSG-RAN WG2 Meeting #82, R2-131829, Fukuoka, Japan.
International Preliminary Report on Patentability for Application No. PCT/SE2013/050946, dated Feb. 11, 2016, 11 pages.
EP OA—EP 13750968.3—dated Mar. 23, 2018—pp. 6.

* cited by examiner

METHODS, NETWORK NODE, WIRELESS DEVICE, COMPUTER PROGRAMS AND COMPUTER PROGRAM PRODUCTS FOR USE WITH DISCONTINUOUS RECEPTION

CROSS-REFERENCE TO RELATED APPLICATIONS

This application is a National stage of International Application No. PCT/SE2013/050946, filed Aug. 2, 2013, which is hereby incorporated by reference.

TECHNICAL FIELD

The invention relates to methods, a network node, wireless device, computer programs and computer program products for use with discontinuous reception.

BACKGROUND

Cellular communication networks evolve towards higher data rates, together with improved capacity and coverage. In the 3rd Generation Partnership Project (3GPP) standardization body, several technologies have been and are also currently being developed.

LTE is a recent standardised technology. It uses an access technology based on OFDM (Orthogonal Frequency Division Multiplexing) for the downlink (DL) and Single Carrier FDMA (SC-FDMA) for the uplink (UL). The resource allocation to wireless devices on both DL and UL is performed adaptively by the concept of fast scheduling, taking into account the instantaneous traffic pattern and radio propagation characteristics of each wireless device. Assigning resources in both DL and UL is performed in the scheduler situated in a network node such as the radio base station.

In order to save power in wireless devices, DRX (Discontinuous Reception) can be used. A DRX cycle consists of a receiving period (also known as on duration) and an idle period (also known as off duration). No data can be received during the energy saving idle period, but only during the receiving period.

It would be greatly beneficial if discontinuous reception can be employed to reduce power requirements in the wireless device, but with reduced risk of any ill-effects due to the idle period.

SUMMARY

It is an object to reduce resource usage when a control message is not received correctly in a wireless device using discontinuous reception.

According to a first aspect, it is presented a method performed in a network node of a cellular network also comprising a wireless device, the wireless device being in a discontinuous reception mode comprising receiving periods and idle periods. The method comprises the steps of: transmitting a first control signal to the wireless device during a receiving period for the wireless device; determining that a first control signal is likely to have failed to be correctly received by the wireless device; determining that a second control signal needs to be transmitted to the wireless device, the second control signal corresponding to the first control signal; when the wireless device is in an idle period, postponing any transmission of the second control signal until the wireless device is in a receiving period; and transmitting the second control signal to the wireless device when the wireless device is in a receiving period. By postponing transmissions of the control signal when the wireless device is in the idle period, the number of unnecessary control signals being sent is reduced when the wireless device fails to receive an initial control signal. Moreover, this leads to fewer packet losses in higher layers, which improves user experience, e.g. by improved sound quality when voice over IP (Internet Protocol) is used.

The step of determining that a first control signal is likely to have failed to be correctly received by the wireless device may comprise determining an absence of a signal from the wireless device being associated with the first control signal. This can e.g. be discontinuous transmission.

In the step of transmitting a first control signal, the first control signal may comprise an uplink resource allocation for the wireless device; and in the step of transmitting a second control signal, the second control signal may comprise an uplink resource allocation for the wireless device.

The step of transmitting a first control signal may comprise transmitting the first control signal during a time slot for a first hybrid automatic repeat request, HARQ, process in which case the step of transmitting the second control signal may comprise transmitting the second control signal during a time slot for the first HARQ process.

The method may further comprise the step, prior to the step of transmitting the second control signal, of: transmitting at least one additional control signal to the wireless device whereby the wireless device is prevented from entering an idle period for a next time slot for the first HARQ process. In this way, the on duration and inactivity timer can be kept relatively short and still be able to cover time slots for any HARQ process. Moreover, this requires no modification of the wireless terminal.

The method may further comprise the step, prior to the step of transmitting the second control signal, of: transmitting an extension control signal to the wireless device indicating the wireless device to extend its receiving period to cover the next time slot for the first HARQ process. In this way, the on duration and inactivity timer can be kept relatively short and still be able to cover time slots for any HARQ process. While the wireless device may need to be modified to understand the extension control signal, with this solution, only one extension control signal is required to be sent to the wireless terminal to cover an arbitrary slot for a HARQ process.

In the step of transmitting a first control signal, the first control signal may comprise a downlink resource allocation for the wireless device; in which case in the step of transmitting a second control signal, the second control signal may comprise a downlink resource allocation for the wireless device.

According to a second aspect it is presented a network node arranged to form part of a cellular network also comprising a wireless device being in a discontinuous reception mode comprising receiving periods and idle periods. The network node comprises: a processor; and a memory storing instructions that, when executed by the processor, causes the network node to: transmit a first control signal to the wireless device during a receiving period for the wireless device; determine that a first control signal is likely to have failed to be correctly received by the wireless device; determine that a second control signal needs to be transmitted to the wireless device, the second control signal corresponding to the first control signal; when the wireless device is in an idle period, postpone any transmission of the second control signal until the wireless device is in a receiving period; and transmit the second control signal to the wireless device when the wireless device is in a receiving period.

The instructions to determine that a first control signal is likely to have failed to be correctly received by the wireless device may comprise instructions to determine an absence of a signal from the wireless device being associated with the first control signal.

The first control signal may comprise an uplink resource allocation for the wireless device; and the second control signal may comprise an uplink resource allocation for the wireless device.

The instructions to transmit a first control signal may comprise instructions to transmit the first control signal during a time slot for a first hybrid automatic repeat request, HARQ, process in which case the instructions to transmit the second control signal may comprise instructions to transmit the second control signal during a time slot for the first HARQ process.

The network node may further comprise instructions to transmit a control signal to the wireless device indicating the wireless device to extend its receiving period to cover the next time slot for the first HARQ process.

The network node according to claim 11, further comprising instructions to: transmit a control signal to the wireless device indicating the wireless device to extend its receiving period to cover the next time slot for the first HARQ process.

The first control signal may comprise a downlink resource allocation for the wireless device; and the second control signal may comprise a downlink resource allocation for the wireless device.

According to a third aspect, it is presented a network node comprising: means for transmitting a first control signal to a wireless device during a receiving period for the wireless device, the network node being part of a cellular network also comprising the wireless device, the wireless device being in a discontinuous reception mode comprising receiving periods and idle periods; means for determining that a first control signal is likely to have failed to be correctly received by the wireless device; means for determining that a second control signal needs to be transmitted to the wireless device, the second control signal corresponding to the first control signal; means for, when the wireless device is in an idle period, postponing any transmission of the second control signal until the wireless device is in a receiving period; and means for transmitting the second control signal to the wireless device when the wireless device is in a receiving period.

The means for determining that a first control signal is likely to have failed to be correctly received by the wireless device may comprise means for determining an absence of a signal from the wireless device being associated with the first control signal.

The first control signal may comprise an uplink resource allocation for the wireless device; and the second control signal may comprise an uplink resource allocation for the wireless device.

The means for transmitting a first control signal may comprise transmitting the first control signal during a time slot for a first hybrid automatic repeat request, HARQ, process in which case the means for transmitting the second control signal may comprise means for transmitting the second control signal during a time slot for the first HARQ process.

The method may further comprise means for transmitting at least one additional control signal to the wireless device whereby the wireless device is prevented from entering an idle period for a next time slot for the first HARQ process.

The method may further comprise means for transmitting an extension control signal to the wireless device indicating the wireless device to extend its receiving period to cover the next time slot for the first HARQ process.

The first control signal may comprise a downlink resource allocation for the wireless device; in which case the second control signal may comprise a downlink resource allocation for the wireless device.

According to a fourth aspect, it is presented a computer program comprising computer program code which, when run on a network node forming part of a cellular network also comprising a wireless device being in a discontinuous reception mode comprising receiving periods and idle periods, causes the network node to: transmit a first control signal to the wireless device during a receiving period for the wireless device; determine that a first control signal is likely to have failed to be correctly received by the wireless device; determine that a second control signal needs to be transmitted to the wireless device, the second control signal corresponding to the first control signal; when the wireless device is in an idle period, postpone any transmission of the second control signal until the wireless device is in a receiving period; and transmit the second control signal to the wireless device when the wireless device is in a receiving period.

According to a fifth aspect it is presented a computer program product comprising a computer program according to the fourth aspect and a computer readable means on which the computer program is stored.

According to a sixth aspect, it is presented a method performed in a wireless device of a cellular network also comprising a network node, the wireless device being in a discontinuous reception mode comprising receiving periods and idle periods. The method comprises the steps of: receiving, during a receiving period, an extension control signal from the network node indicating the wireless device to extend its receiving period; and extending the receiving period with an amount indicated in the extension control signal.

According to a seventh aspect, it is presented a wireless device arranged to form part of a cellular network also comprising a network node, where the wireless device being in a discontinuous reception mode comprising receiving periods and idle periods. The wireless device comprises: a processor; and a memory storing instructions that, when executed by the processor, causes the wireless device to: receive, during a receiving period, an extension control signal from the network node indicating the wireless device to extend its receiving period; and extend the receiving period with an amount indicated in the extension control signal.

According to an eighth aspect, it is presented a wireless device comprising: means for receiving, during a receiving period, an extension control signal from s network node indicating the wireless device to extend its receiving period, the wireless device forming part of a cellular network also comprising the network node, the wireless device being in a discontinuous reception mode comprising receiving periods and idle periods; and means for extending the receiving period with an amount indicated in the extension control signal.

According to a ninth aspect, it is presented a computer program comprising computer program code which, when run on a wireless device forming part of a cellular network also comprising a network node, where the wireless device is in a discontinuous reception mode comprising receiving periods and idle periods, causes the wireless device to: transmit a first control signal to the wireless device during a receiving period for the wireless device; receive, during a receiving period, an extension control signal from the network node indicating the wireless device extend its receiving period; and extend the receiving period with an amount indicated in the extension control signal.

According to a tenth aspect, it is presented a computer program product comprising a computer program according to the ninth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
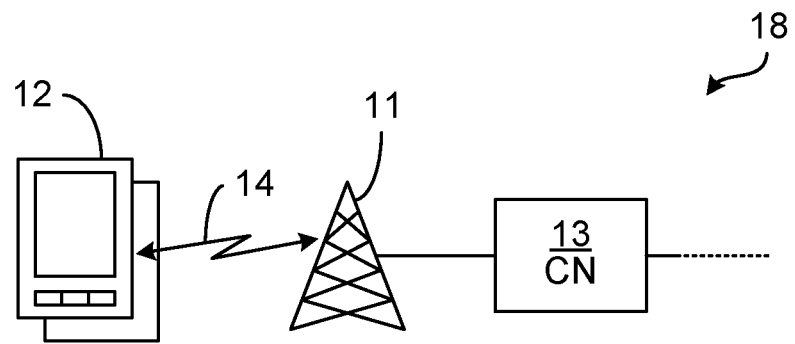
FIG. 1 is a schematic diagram illustrating a cellular network where embodiments presented herein may be applied.

FIG. 1 is a schematic diagram illustrating a cellular network 18 where embodiments presented herein may be applied. The cellular network 18 comprises a core network 13 and one or more network nodes 11, here in the form of radio base stations being evolved Node Bs, also known as eNode Bs or eNBs. The network node 11 could also be in the form of Node Bs, BTSs (Base Transceiver Stations) and/or BSSs (Base Station Subsystems), etc. The network node 11 provides radio connectivity to a plurality of wireless devices 12. The term wireless device is also known as mobile communication terminal, user equipment (UE), mobile terminal, user terminal, user agent, wireless terminal, machine-to-machine devices etc., and can be, for example, what today are commonly known as a mobile phone or a tablet/laptop with wireless connectivity or fixed mounted terminal.

The cellular network 18 may e.g. comply with any one or a combination of LTE (Long Term Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

Uplink communication (from the wireless device) and downlink communication (to the wireless device) between the wireless device 12 and the network node 11 occur over a wireless radio interface 14. The quality of the wireless radio interface 14 to each wireless device 12 can vary over time and depending on the position of the wireless device 12, due to effects such as fading, multipath propagation, interference, etc.

The network node 11 is also connected to the core network 13 for connectivity to central functions and a wide area network, such as the Internet.

Figure 2:
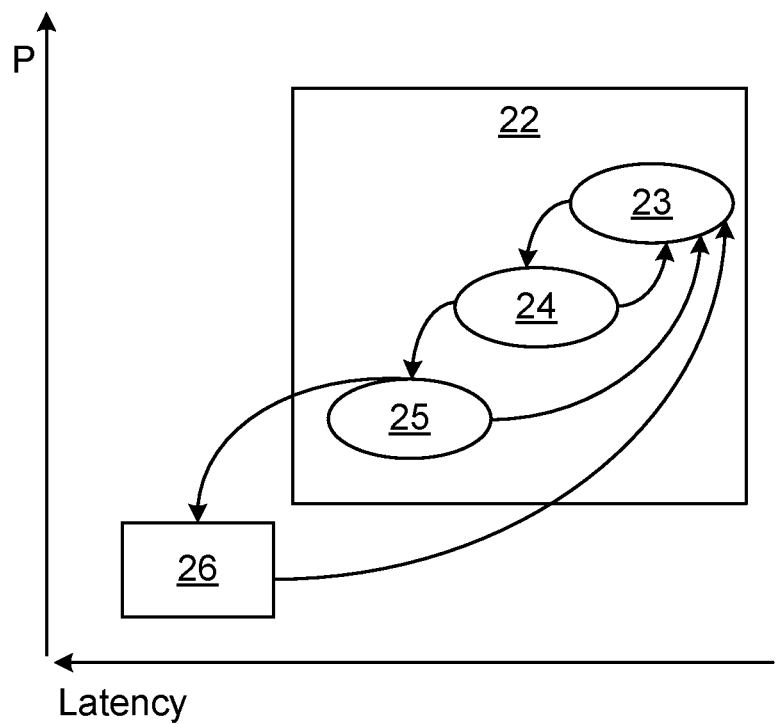
FIG. 2 is a state diagram illustrating various power states for a wireless device of FIG. 1 in a discontinuous reception mode.

FIG. 2 is a state diagram illustrating various power states for a wireless device of FIG. 1 in a discontinuous reception mode. Each state uses an average power and involves an average latency for communication. In the diagram of FIG. 2, states further to the left involve a greater latency and states further up involve greater average power usage for the wireless device in question.

The states are used for Discontinuous Reception (DRX), which is a feature provided in LTE/E-UTRAN (Evolved UMTS (Universal Mobile Telecommunications System) Terrestrial Radio Access Network) for saving power in the wireless device, and thus reducing battery consumption. A DRX cycle consists of a receiving period of an on duration and an idle period of an off duration, with a combined period then being the on duration plus the off duration. No data can be received during the energy saving off duration, whereby the device is in an temporarily incommunicable state. If data is received in downlink during the on duration, the wireless device will stay awake and start an inactivity timer. As long as the inactivity timer has not expired, the wireless device is in a communicable state.

There are two main states shown in FIG. 2, an RRC_IDLE state 26 and an RRC_CONNECTED state 22. In DRX, the RRC_CONNECTED state 22 comprises three individual states: a long DRX state 25, optionally a short DRX state 24 and a continuous reception state 23. The short DRX state 24 is optionally supported by the wireless device in question. The continuous reception state 23 is above the other states 24, 25, 26 in the diagram of FIG. 2, thereby using more power. Hence the power saving states 24, 25, 26 use progressively less power on average than the continuous reception state 23.

When in one of the long and short DRX states 24-25, the wireless device does not constantly monitor the PDCCH (Physical Downlink Control Channel), but only during specific receiving periods. During these states 24-25, the wireless device goes into power saving idle mode, being an off period, for part of the time, which decreases power consumption.

Hence, two DRX cycles can be set for each wireless device: a short DRX cycle for the short DRX state 24 and a long DRX cycle for the long DRX state 25. When the wireless device is in the continuous reception state 23, an inactivity timer is started after a downlink packet is received. When the inactivity timer expires, the wireless device switches to the long DRX state 25 unless short DRX is configured, in which case it first stays in the short DRX state 24 for a configurable amount of time. In the DRX states 24 and 25, the wireless device can only receive packets during the on duration.

From the RRC_IDLE state 26, a random access procedure is required to get the wireless device back to the RRC_CONNECTED state 22 in general, and the continuous reception state 23 in particular.

There are a number of power state parameters that can be configured in the DRX state, such as on duration, the inactivity timer, the short DRX cycle timer, the long DRX cycle timer, the duration of the short DRX cycle, the duration of the long DRX cycle, retransmission timer, start offset, etc. These power state parameters can be configured for each wireless device separately and thus at least partly define when the wireless device is to be in an continuous reception state 23 or one of the power saving states 24, 25, 26. The retransmission timer parameter specifies the maximum number of consecutive PDCCH (Physical Downlink Control Channel) subframes the wireless device should remain active to be ready to receive an incoming retransmission after the first available retransmission time. The start offset parameter is an offset for each wireless device so that, in the time domain, not all wireless devices start receiving at the same time.

Figure 3:
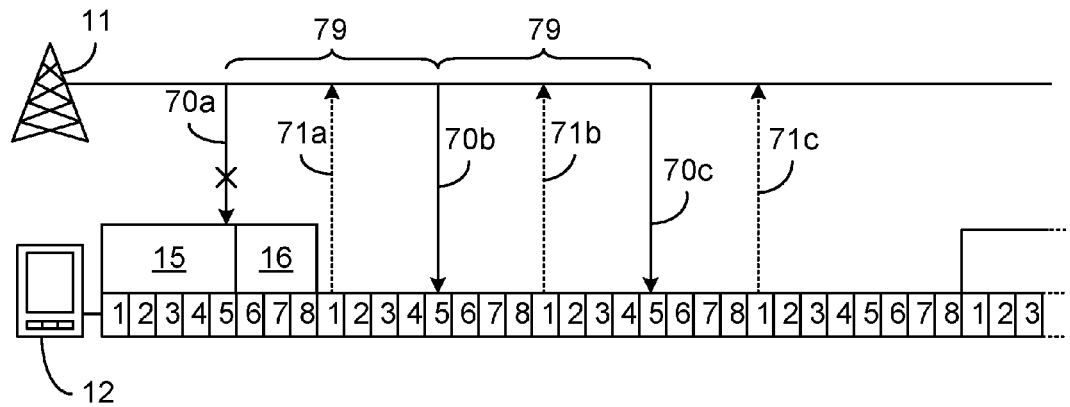
FIGS. 3-8 are schematic diagrams illustrating signalling between the network node and the wireless device of FIG. 1 according to various embodiments.

FIG. 3 is a schematic diagram illustrating signalling between the network node and the wireless device of FIG. 1 to illustrate one problem. Time proceeds from left to right. In the bottom section, HARQ process slots 1-8 are illustrated, representing respective HARQ processes. The HARQ process slots are repeated, and each HARQ process slot corresponds to a 1 ms subframe.

In this example, the network node 11 sends a first UL scheduling grant 70a over PDCCH in a HARQ process slot 5. For some reason, the wireless device 12 fails to receive the first UL scheduling grant 70a, indicated by the cross on the arrow. This can e.g. be due to poor radio conditions, such as path loss, interference, etc.

The wireless device 12 is in DRX and is in the continuous reception state during an on-duration 15, where both the wireless device 12 and the network node 11 keeps track of corresponding inactivity timers for the particular wireless device. An inactivity timer 16 starts to supervise a switch from the continuous reception state 23 back to cyclic DRX on the network side after the first UL scheduling grant 70a. But since the wireless device 12 did not receive the first UL scheduling grant, the wireless device does not start its corresponding inactivity timer.

In the idle period, there is no uplink transmission (which would occur if the UL scheduling grant would have been correctly received), whereby the network node 11 interprets the absence of uplink data as a first discontinuous transmission (DTX) 71a.

The network node 11 then attempts to send a second UL scheduling grant 70b to the wireless device in the next corresponding HARQ process slot 5, one round trip time (MT), being 8 ms, from the first UL scheduling grant 70a.

However, the second UL scheduling grant 70b can not be received by the wireless device since it is in an idle period. This results in a second DTX 71b. This continues with a third UL scheduling grant 70c and a third DTX 71c. It is only when the wireless device 12 wakes up from the idle period that it can again attempt to receive an UL scheduling grant. And this may take some time, depending on a configured time for off-duration, on-duration, etc. Since the UL scheduling grants will not be received, these create a waste of resources on PDCCH and higher layer packets may be lost, leading to a deteriorated user experience.

Figure 4:
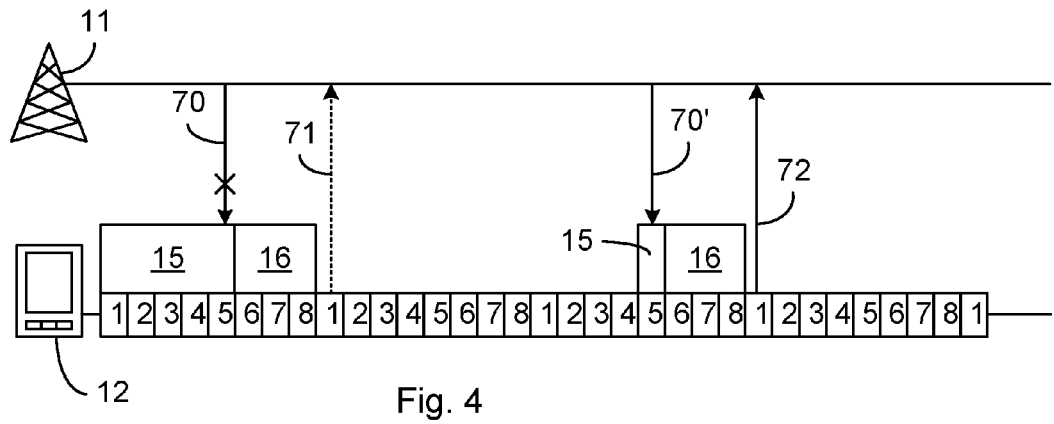

Looking now to FIG. 4, the initial UL scheduling grant 70 (in a first control signal), of a fifth HARQ process slot 5, is again not received by the wireless device 12. This results in the network node 11 interpreting a DTX 71. In this example, however, the network node determines, from the DTX 71, that the first control signal is likely to have failed to be correctly received by the wireless device. This results in the network node 11 postponing the transmission of any new UL scheduling grants until the wireless device 12 is in a receiving period again, and thus able to receive the new UL scheduling grant. Note that FIG. 4 shows the network side of inactivity timers, just as shown in FIG. 3.

Hence, a second control signal comprising a new UL scheduling grant 70' is sent during the next on-duration 15, at a fifth HARQ process slot 5, of the same process as the original UL scheduling grant 70. This allows the wireless device to send UL data 72 in accordance with the new UL scheduling grant 70'.

Figure 5:
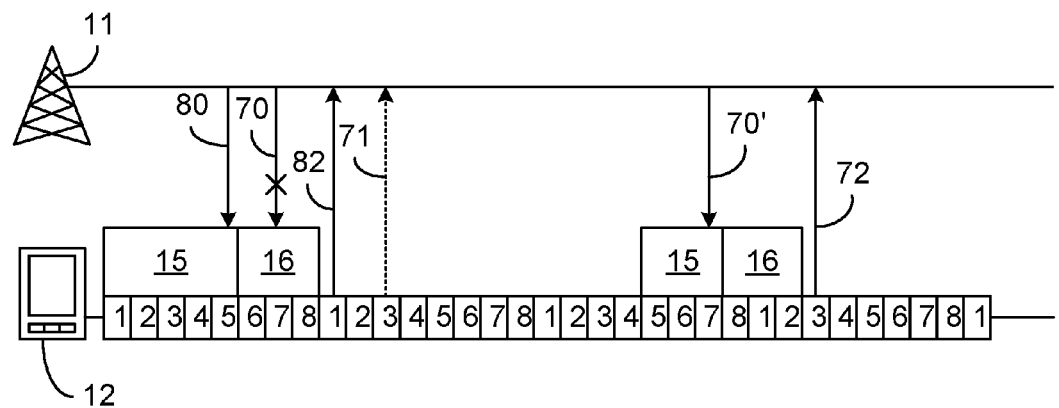

In FIG. 5, there are two separate HARQ processes at the fifth HARQ process slots 5 and the seventh HARQ process slot 7, respectively. A control signal comprising an UL scheduling grant 80 for a first HARQ process at process slot 5 is correctly received by the wireless device 12 and thus results in UL data 82 being transmitted from the wireless device 12. For a second HARQ process at process slot 7, which behaves the same way as explained above with reference to FIG. 4, i.e. postponing the new UL scheduling grant 70' after a DTX 71 until the wireless device is in a receiving period. However, in this example, the inactivity timer 16 reflects the wireless device side, where the inactivity timer 16 (in the first instance) is triggered by the UL scheduling grant 80 for the first HARQ process, but not for the UL scheduling grant 70 for the second HARQ process. Hence, the two HARQ processes have their own handling of any new UL scheduling.

Figure 6:
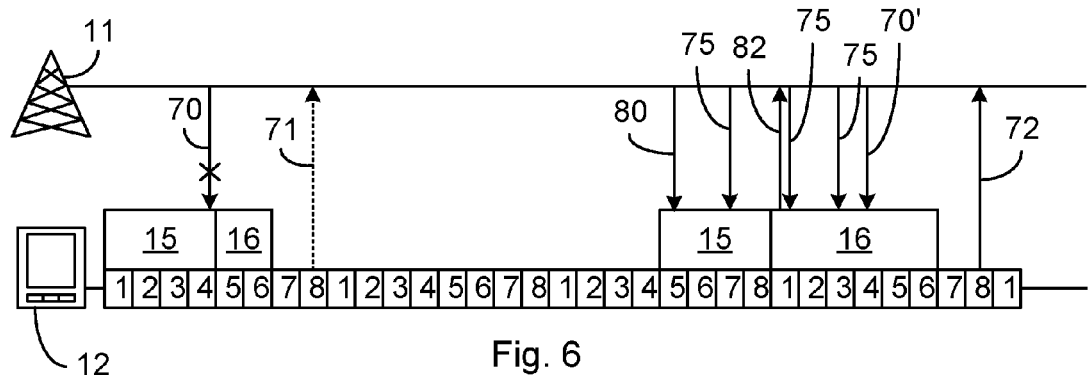

In FIG. 6, an embodiment is shown where the wireless device is prevented from going to the idle period when the new UL scheduling grant is due to be received. Here, the initial UL scheduling grant 70 for the first HARQ process is not received correctly at the wireless device 12, whereby the DTX 71 is interpreted by the network node 11. The network node sends UL scheduling grants of the first HARQ process in a fourth HARQ process slot 4. As explained above, the network node 11 postpones sending any new UL scheduling grants until the next receiving period.

A control signal comprising an UL scheduling grant 80 for a second HARQ process is then sent, which happens to be in a fifth HARQ process slot 5. The new UL scheduling grant 70' needs to be transmitted in the same HARQ process as for the original first UL scheduling grant 70, i.e. in a fourth HARQ process slot 4. However, if no new data is received at the wireless device 12, the inactivity timer of the wireless device 12 will make the wireless device enter the idle mode. The network node 11 is aware of the timer values and consequently sends additional control signals 75 to the wireless device in order to avoid the inactivity timer of the wireless device from expiring. The additional control signals are any control signal which indicate new data, thereby resetting the inactivity timer for the wireless device 12. For example, the additional control signals can be UL scheduling grants for a minimal amount of data (a grant which the wireless device 12 would then not need to utilise). The additional control signals do not need to perform any other function than keeping the wireless device active and can thus be dummy messages. The additional control signals allow the network node 11 to send the new UL scheduling grant 70' in a receiving period, when the wireless device 12 is able to receive the new UL scheduling grant 70'. Subsequently, the wireless device sends UL data 72 in accordance with the new UL scheduling grant 70'. Using this embodiment, the wireless device does not need to be modified to be kept awake to receive the new scheduling grant 70'.

Figure 7:
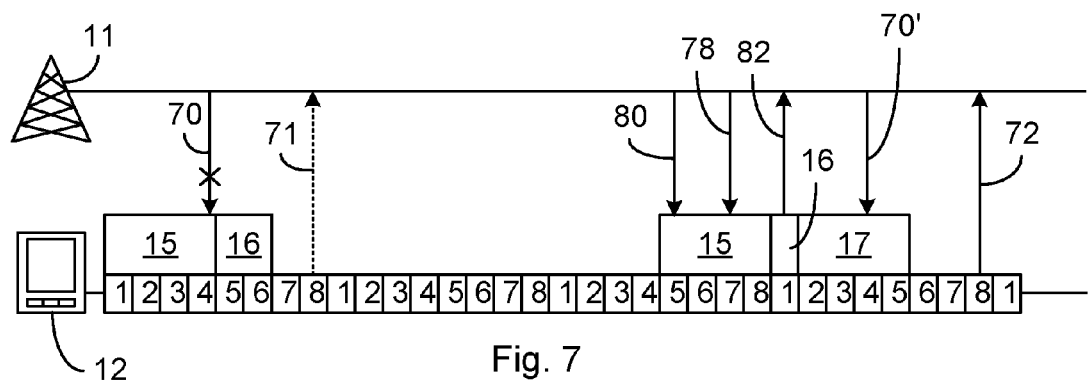

In FIG. 7, another embodiment is shown where the wireless device is prevented from going to the idle period when the new UL scheduling grant is due to be received. Instead of sending additional control signals to keep the wireless device 12 awake, the network node 11 here sends an extension control signal 78 to the wireless device 12. The extension control signal 78 indicates to the wireless device 12 to extend its receiving period. In this way, the receiving period can be extended to cover the next time slot for the first HARQ process, i.e. the fourth HARQ process slot 4 in this example. In this way, only one extension control signal 78 needs to be sent by the network node 11, and no resources need to be allocated for this message. However, the wireless device 12 need to be able to receive and act upon this extension control signal as explained here. The method for the wireless device for this extension control signal is explained with reference to FIG. 10 below.

It is to be noted that there are other ways in which it can be ensured that the wireless node 12 is in a receiving mode when the new UL scheduling grant is sent. For example, the parameters for the DRX (such as on-duration and/or inactivity timer value) can be adjusted to make sure the slot for the relevant HARQ process is covered. Such adjustment could be reversed after the transmission of the new UL scheduling grant or the new parameters DRX could be left until further notice.

Figure 8:
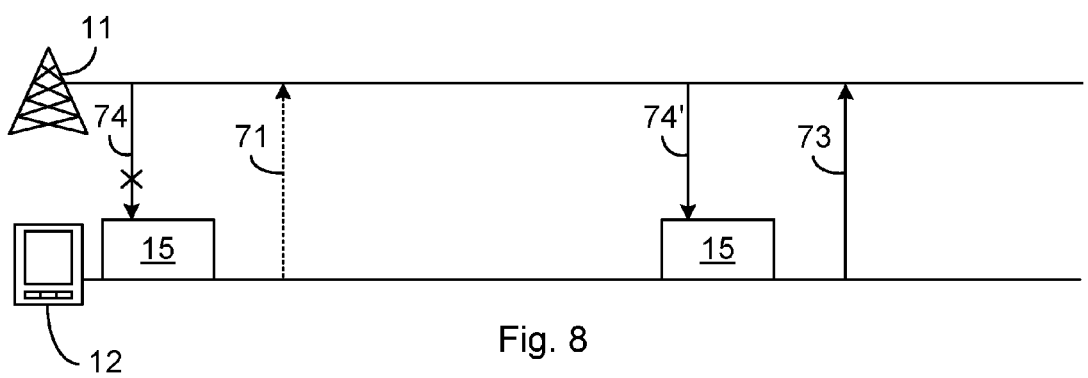

FIG. 8 illustrates an embodiment for DL transmission. Here, a first control signal comprising a DL resource allocation 74 is sent from the network node 11 to the wireless device 12. For some reason, the wireless device 12 fails to receive the first control signal 74, indicated by the cross on the arrow. This can e.g. be due to poor radio conditions, such as path loss, interference, etc.

Again, the wireless device 12 is in DRX and is in the continuous reception state during an on-duration 15. An inactivity timer 16 then starts (since the wireless device 12 never received the first control signal 74), after which the wireless device enters an idle period until it is time for the wireless device to enter the active mode again.

In the idle period, there is no acknowledgement of the first DL assignment, whereby the network node 11 interprets the absence of the acknowledgment as a DTX 71.

The network node 11 then determines that the wireless device 12 is in an idle mode and postpones sending any new control signals comprising DL resource allocations until the next on-duration period 15. Hence, in the next on-duration period 15, the network node 11 sends a second control signal 74', comprising a new DL resource allocation for the wireless device 12. When the wireless device 12 receives this correctly, the wireless device 12 sends an acknowledgement 73 to the network node 11, after which the network node 11 can transmit DL data accordingly.

It is to be noted that for DL, the control signals do not need to align to slots for the same HARQ process.

Using this embodiment not only relieves the network node 11 of transmitting unnecessary control signals with DL resource allocations during the idle period, but also frees up DL resources allocated for the wireless device 12 during the idle period, allowing these DL resources to be used for other purposes, such as DL transmissions to other wireless devices.

Figure 9A:
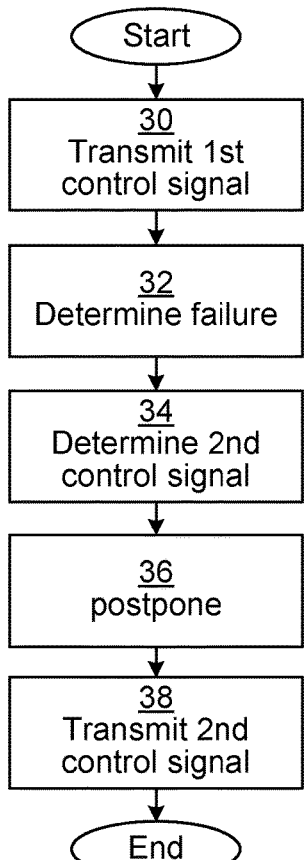
FIGS. 9A-C are flow charts illustrating methods performed in the network node of FIG. 1.

FIG. 9A is a flow chart illustrating a method performed in the network node 11 of FIG. 1.

In a transmit $1^{st}$ control signal step 30, a first control signal is transmitted to the wireless device during a receiving period for the wireless device. Optionally, the first control signal comprises an uplink resource allocation for the wireless device, sent over PDCCH. Alternatively or additionally, the first control signal can comprise a downlink resource allocation for the wireless device, sent over PDCCH. In other words, the first control signal can relate to either uplink or downlink. The first control signal can e.g. be transmitted during a time slot for a first HARQ process, particularly when related to uplink.

In a determine failure step 32, the network node determines that a first control signal is likely to have failed to be correctly received by the wireless device. Optionally, this comprises determining an absence of a signal from the wireless device being associated with the first control signal, e.g. determining a DTX.

In a determine $2^{nd}$ control signal step 34, the network node determines that a second control signal needs to be transmitted to the wireless device, the second control signal corresponding to the first control signal.

In a postpone step 36, when the wireless device is in an idle period, the network node postpones any transmission of the second control signal until the wireless device is in a receiving period.

In a transmit $2^{nd}$ control signal step 38, the second control signal is transmitted to the wireless device when the wireless device is in a receiving period. Optionally, the second control signal comprises an uplink resource allocation for the wireless device, sent over PDCCH. The second control signal is optionally transmitting during a time slot for the first HARQ process, i.e. a time slot for the same HARQ process as for the first control signal. Optionally, the second control signal comprises a downlink resource allocation for the wireless device.

Figure 9B:
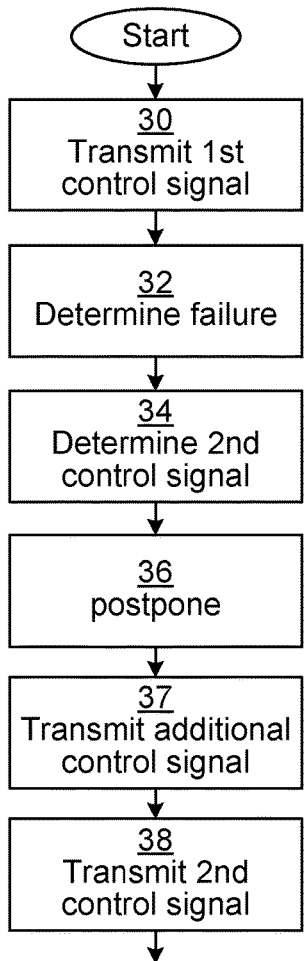

FIG. 9B is a flow chart illustrating a method performed in the wireless device of FIG. 1. This method is similar to the method illustrated in FIG. 9A, and only new or modified steps, in relation to FIG. 9A, will be described.

Here, prior to the transmit $2^{nd}$ control signal step 38, there is a transmit additional control signal step 37. In this step, at least one additional control signal is transmitted to the wireless device whereby the wireless device is prevented from entering an idle period for a next time slot for the first HARQ process.

Figure 9C:
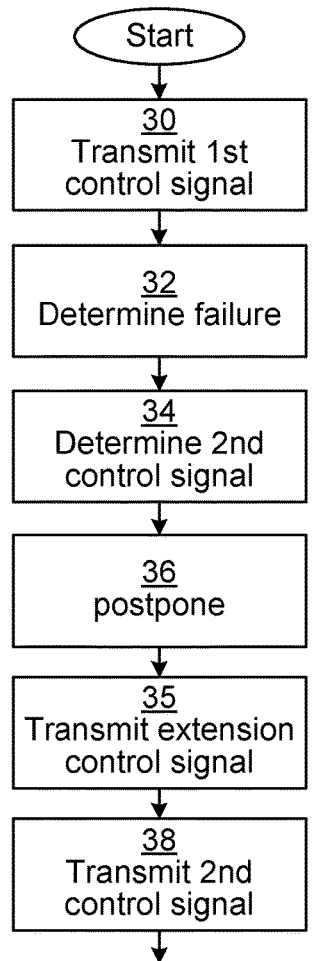

FIG. 9C is a flow chart illustrating a method performed in the wireless device of FIG. 1. This method is similar to the method illustrated in FIG. 9A, and only new or modified steps, in relation to FIG. 9A, will be described.

Here, prior to the transmit $2^{nd}$ control signal step 38, there is a transmit extension control signal step 35. In this step, an extension control signal is transmitted to the wireless device indicating the wireless device to extend its receiving period to cover the next time slot for the first HARQ process.

Figure 10:
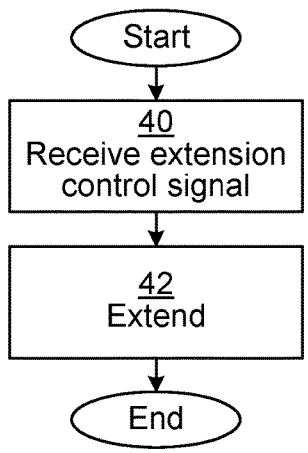
FIG. 10 is a flow chart illustrating a method performed in the wireless device of FIG. 1.

FIG. 10 is a flow chart illustrating a method performed in the wireless device of FIG. 1.

In a receive extension control signal step 40, an extension control signal is received from the serving network node indicating the wireless device to extend its receiving period.

In an extend step 42, the receiving period is extended with an amount indicated in the extension control signal.

Figure 11:
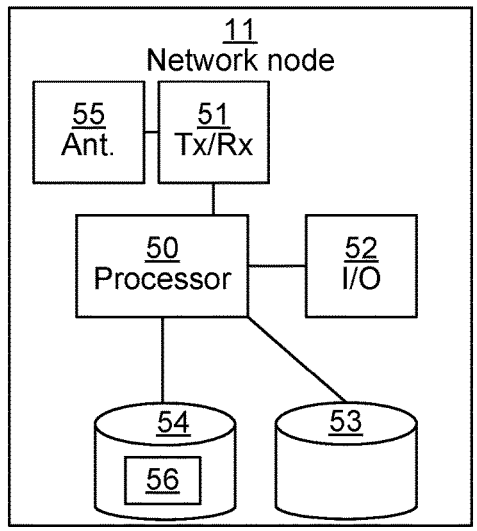
FIG. 11 is a schematic diagram illustrating some components of the network node of FIG. 1.

FIG. 11 is a schematic diagram showing some components of the network node 11 of FIG. 1. A processor 50 is provided using any combination of one or more of a suitable central processing unit (CPU), multiprocessor, microcontroller, digital signal processor (DSP), application specific integrated circuit etc., capable of executing software instructions 56 stored in a memory 54, which can thus be a computer program product. The processor 50 can be configured to execute the method described with reference to FIGS. 9A-C above.

The memory 54 can be any combination of read and write memory (RAM) and read only memory (ROM). The memory 54 also comprises persistent storage, which, for example, can be any single one or combination of magnetic memory, optical memory, solid state memory or even remotely mounted memory.

A data memory 53 is also provided for reading and/or storing data during execution of software instructions in the processor 50. The data memory 53 can be any combination of read and write memory (RAM) and read only memory (ROM).

The network node 11 further comprises an I/O interface 52 for communicating with other external entities. Optionally, the I/O interface 52 also includes a user interface.

The network node 11 also comprises one or more transceivers 51, comprising analogue and digital components, and a suitable number of antennas 55 for wireless communication with wireless devices.

Other components of the network node 11 are omitted in order not to obscure the concepts presented herein.

Figure 12:
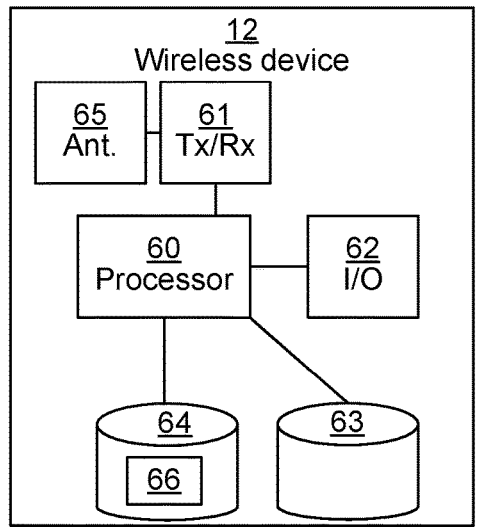
FIG. 12 is a schematic diagram illustrating some components of the wireless device of FIG. 1.

FIG. 12 is a schematic diagram showing some components of the wireless devices 12 of FIG. 1, here represented by a single wireless device 12. A processor 60 is provided using any combination of one or more of a suitable central processing unit (CPU), multiprocessor, microcontroller, digital signal processor (DSP), application specific integrated circuit etc., capable of executing software instructions 66 stored in a memory 64, which can thus be a computer program product. The processor 60 can be configured to execute the method described with reference to FIG. 10 above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 63 is also provided for reading and/or storing data during execution of software instructions in the processor 60. The data memory 63 can be any combination of read and write memory (RAM) and read only memory (ROM), e.g. in the form of a persistent storage, which, for example, can be any single one or combination of magnetic memory, optical memory, solid state memory or even remotely mounted memory.

The wireless device 12 further comprises an I/O interface 62. The I/O interface 62 can optionally comprise a user interface including any of a display, input devices (input keys, touch sensitivity of the screen, etc.), speaker, microphone, etc.

The wireless device 12 also comprises one or more transceivers 61, comprising analogue and digital components, and a suitable number of antennas 65 for wireless communication with the network node.

Other components of the wireless device 12 are omitted in order not to obscure the concepts presented herein.

Figure 13:
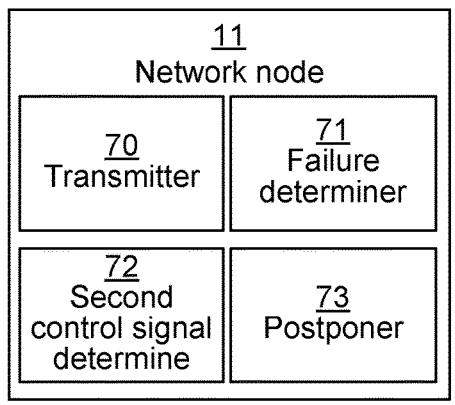
FIG. 13 is a schematic diagram showing functional modules of the network node of FIGS. 1 and 11.

FIG. 13 is a schematic diagram showing functional modules of the network node 11 of FIGS. 1 and 11. The modules can be implemented using software instructions such as a computer program executing in the network node 11 and/or using hardware, such as application specific integrated circuits, field programmable gate arrays, discrete logical components, etc. The modules correspond to the steps in the methods illustrated in FIGS. 9A-C.

A transmitter 70 is arranged to transmit the first control signal to the wireless device during a receiving period for the wireless device, transmit the second control signal to the wireless device when the wireless device is in a receiving period, optionally transmit at least one additional control signal to the wireless device and optionally transmit an extension control signal to the wireless device. This module corresponds to the transmit $1^{st}$ control signal step and transmit $2^{nd}$ control signal step 38 of FIGS. 9A-C, the transmit additional control signal step 37 of FIG. 9B and the transmit extension control signal step 35 step of FIG. 9C.

A failure determiner 71 is arranged to determine that a first control signal is likely to have failed to be correctly received by the wireless device. This module corresponds to the determine failure step 32 of FIGS. 9A-C.

A second control signal determiner 72 is arranged to determine that the second control signal needs to be transmitted to the wireless device. The second control signal corresponds to the first control signal. This module corresponds to the determine $2^{nd}$ control signal step 34 of FIGS. 9A-C.

A postpone 72 is arranged to postpone, when the wireless device is in an idle period, any transmission of the second control signal until the wireless device is in a receiving period. This module corresponds to the postpone step 36 of FIGS. 9A-C.

Figure 14:
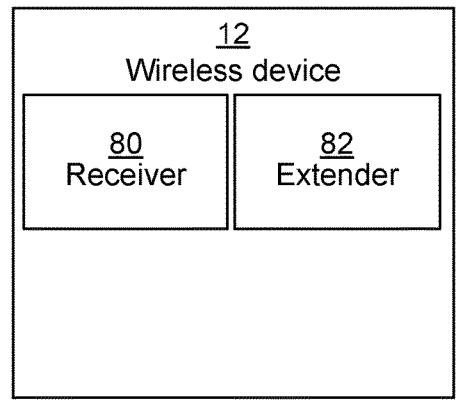
FIG. 14 is a schematic diagram showing functional modules of the wireless device of FIGS. 1 and 12.

FIG. 14 is a schematic diagram showing functional modules of the wireless device 12 of FIGS. 1 and 12. The modules can be implemented using software instructions such as a computer program executing in the wireless device 12 and/or using hardware, such as application specific integrated circuits, field programmable gate arrays, discrete logical components, etc. The modules correspond to the steps in the methods illustrated in FIG. 10.

A receiver 80 is arranged to receive, during a receiving period, an extension control signal from the network node indicating the wireless device to extend its receiving period. This module corresponds to the receive extension control signal step 40 of FIG. 10.

An extender 82 is arranged to extend the receiving period with an amount indicated in the extension control signal. This module corresponds to the extend step 42 of FIG. 10.

Figure 15:
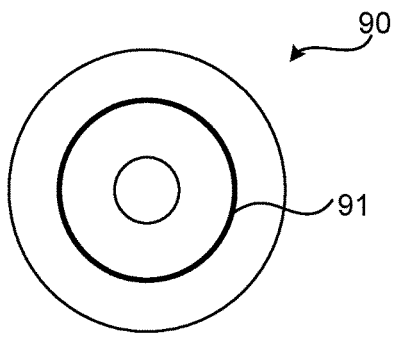
FIG. 15 shows one example of a computer program product 90 comprising computer readable means.

FIG. 15 shows one example of a computer program product 90 comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 56 of FIG. 11 and/or 66 of FIG. 12. While the computer program 91 is here schematically shown as a track on the depicted optical disk, the computer program can be stored in any way which is suitable for the computer program product.

The invention has mainly been described above with reference to a few embodiments. However, as is readily appreciated by a person skilled in the art, other embodiments than the ones disclosed above are equally possible within the scope of the invention.

The invention claimed is:

1. A method performed in a network node of a cellular network also comprising a wireless device, the wireless device being in a discontinuous reception mode comprising receiving periods and idle periods, the method comprising:
   transmitting a first control signal to the wireless device during a receiving period for the wireless device, wherein transmitting the first control signal during a time slot for the wireless device to perform a first hybrid automatic repeat request (HARQ) process,
   wherein, when transmitting the first control signal, the first control signal comprises an uplink resource allocation for the wireless device;
   determining that the first control signal is likely to have failed to be correctly received by the wireless device;
   determining that a second control signal needs to be transmitted to the wireless device, the second control signal corresponding to the first control signal to perform the HARQ process, when the wireless device is in an idle period;
   postponing any transmission of the second control signal until the wireless device is in a receiving period, wherein the second control signal comprises transmitting the second control signal during the time slot for the first HARQ process;
   transmitting only one extension control signal to the wireless device to extend the time slot for receiving the second control signal, wherein the extension control signal prevents the wireless device from going to the idle period when the second control signal is due to be received, wherein no resources need to be allocated for the extension control signal; and
   transmitting the second control signal to the wireless device, when the wireless device is in an extended time slot, wherein, when transmitting the second control signal, the second control signal comprises an uplink resource allocation for the wireless device.

2. The method according to claim 1, wherein the determining that the first control signal is likely to have failed to be correctly received by the wireless device comprises determining an absence of a signal from the wireless device being associated with the first control signal.

3. The method according to claim 1, further comprising transmitting the signal to reset an inactivity timer to extend the time slot.

4. The method according to claim 1, wherein when transmitting the first control signal, the first control signal comprises a downlink resource allocation for the wireless device; and when transmitting the second control signal, the second control signal comprises the downlink resource allocation for the wireless device.

5. A network node arranged to form part of a cellular network also comprising a wireless device, the wireless device being in a discontinuous reception mode comprising receiving periods and idle periods, the network node comprising:
   a processor; and
   a memory storing instructions that, when executed by the processor, cause the network node to:
      transmit a first control signal to the wireless device during during a receiving period for the wireless device, wherein transmitting the first control signal during a time slot for the wireless device to perform a first hybrid automatic repeat request (HARQ) process,
      wherein, when transmitting the first control signal, the first control signal comprises an uplink resource allocation for the wireless device;
      determine that the first control signal is likely to have failed to be correctly received by the wireless device;
      determine that a second control signal needs to be transmitted to the wireless device, the second control signal corresponding to the first control signal to perform the HARQ process, when the wireless device is in an idle period;
      postpone any transmission of the second control signal until the wireless device is in a receiving period, wherein the second control signal comprises transmitting the second control signal during the time slot for the first HARQ process;
      transmit only one extension control signal to the wireless device to extend the time slot for receiving the second control signal, wherein the extension control signal prevents the wireless device from going to the idle period when the second control signal is due to be received, wherein no resources need to be allocated for the extension control signal; and
      transmit the second control signal to the wireless device when the wireless device is in an extended time slot, wherein, when transmitting the second control signal, the second control signal comprises an uplink resource allocation for the wireless device.

6. The network node according to claim 5, wherein the instructions to determine that the first control signal is likely to have failed to be correctly received by the wireless device comprises instructions to determine an absence of a signal from the wireless device being associated with the first control signal.

7. The network node according to claim 5, wherein the first control signal comprises an uplink resource allocation for the wireless device; and the second control signal comprises the uplink resource allocation for the wireless device.

8. The network node according to claim 5, further comprising instructions to transmit the signal to reset an inactivity timer to extend the time slot.

9. The network node according to claim 5, further comprising instructions to transmit the extension control signal to the wireless device to extend the time slot.

10. The network node according to claim 5, wherein the first control signal comprises a downlink resource allocation for the wireless device; and the second control signal comprises the downlink resource allocation for the wireless device.

11. A non-transitory computer readable storage medium having stored thereon computer program code which, when executed by a processor on a network node forming part of a cellular network also comprising a wireless device, where the wireless device being in a discontinuous reception mode comprising receiving periods and idle periods, cause the network node to:
   transmit a first control signal to the wireless device during receiving period for the wireless device, wherein transmitting the first control signal during a time slot for the wireless device to perform a first hybrid automatic repeat request (HARQ) process, wherein, when transmitting the first control signal, the first control signal comprises an uplink resource allocation for the wireless device;
determine that the first control signal is likely to have failed to be correctly received by the wireless device;
determine that a second control signal needs to be transmitted to the wireless device, the second control signal corresponding to the first control signal to perform the HARQ process, when the wireless device is in an idle period;
postpone any transmission of the second control signal until the wireless device is in a receiving period, wherein the second control signal comprises transmitting the second control signal during the time slot for the first HARQ process;
transmit only one extension control signal to the wireless device to extend the time slot for receiving the second control signal, wherein the extension control signal prevents the wireless device from going to the idle period when the second control signal is due to be received, wherein no resources need to be allocated for the extension control signal; and
transmit the second control signal to the wireless device when the wireless device is in an extended time slot, wherein, when transmitting the second control signal, the second control signal comprises an uplink resource allocation for the wireless device.

12. A method performed in a wireless device of a cellular network also comprising a network node, the wireless device being in a discontinuous reception mode comprising receiving periods and idle periods, the method comprising:
receiving, during a receiving period, only one extension control signal from the network node indicating the wireless device to extend its receiving period to receive a control signal for performing a first hybrid automatic repeat request (HARQ) process,
wherein the extension control signal prevents the wireless device from going to the idle period when the second control signal is due to be received, wherein no resources need to be allocated for the extension control signal,
wherein the extension control signal is sent from the network node in response to the network node sending the control signal to the wireless device and not receiving a response from the wireless device; and
extending the receiving period with an amount indicated in the extension control signal to receive the control signal for performing the first HARQ process.

13. A wireless device arranged to form part of a cellular network also comprising a network node, where the wireless device being in a discontinuous reception mode comprising receiving periods and idle periods, the wireless device comprising:
a processor; and
a memory storing instructions that, when executed by the processor, causes the wireless device to:
receive, during a receiving period, only one extension control signal from the network node indicating the wireless device to extend its receiving period to receive a control signal for performing a first hybrid automatic repeat request (HARQ) process,
wherein the extension control signal prevents the wireless device from going to the idle period when the second control signal is due to be received, wherein no resources need to be allocated for the extension control signal,
wherein the extension control signal is sent from the network node in response to the network node sending the control signal to the wireless device and not receiving a response from the wireless device; and
extend the receiving period with an amount indicated in the extension control signal to receive the control signal for performing the first HARQ process.

14. A non-transitory computer readable storage medium having stored thereon computer program code which, when executed by a processor on a wireless device forming part of a cellular network also comprising a network node, where the wireless device is in a discontinuous reception mode comprising receiving periods and idle periods, causes the wireless device to:
receive, during a receiving period, only one extension control signal from the network node indicating the wireless device to extend its receiving period to receive a control signal for performing a first hybrid automatic repeat request (HARQ) process,
wherein the extension control signal prevents the wireless device from going to the idle period when the second control signal is due to be received, wherein no resources need to be allocated for the extension control signal,
wherein the extension control signal is sent from the network node in response to the network node sending the control signal to the wireless device and not receiving a response from the wireless device; and
extend the receiving period with an amount indicated in the extension control signal to receive the control signal for performing the first HARQ process.

* * * * *